A. FORNANDER.
APPARATUS FOR TREATING MILK AND OTHER LIQUIDS.
APPLICATION FILED JULY 2, 1912.

1,230,395.

Patented June 19, 1917.
2 SHEETS—SHEET 1.

Witnesses:
Inventor.
Alfred Fornander
By his Attorney

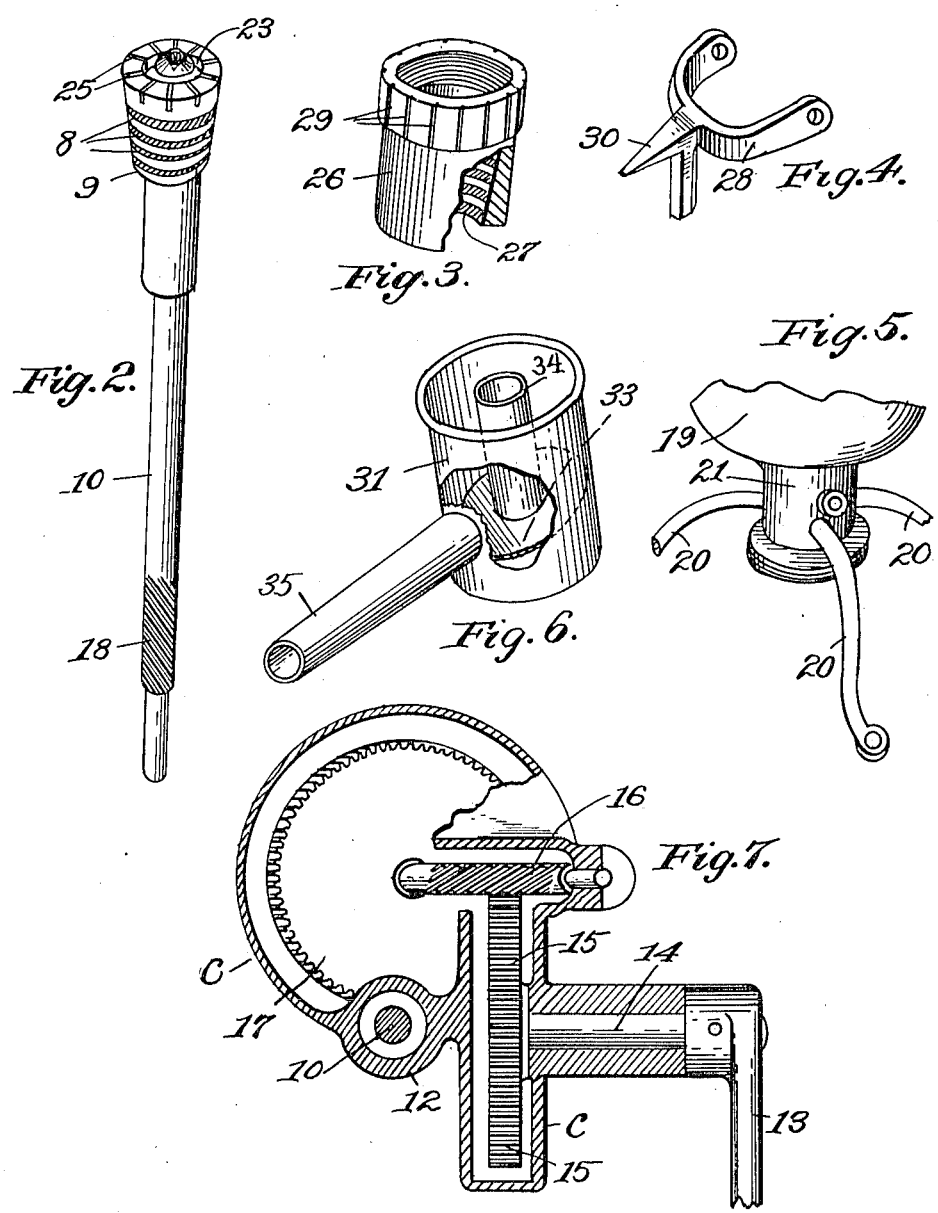

# UNITED STATES PATENT OFFICE.

ALFRED FORNANDER, OF NEW YORK, N. Y., ASSIGNOR TO EDGAR T. WALLACE, OF NEW YORK, N. Y.

APPARATUS FOR TREATING MILK AND OTHER LIQUIDS.

1,230,395.  Specification of Letters Patent.  Patented June 19, 1917.

Application filed July 2, 1912. Serial No. 707,189.

*To all whom it may concern:*

Be it known that I, ALFRED FORNANDER, a subject of the King of Sweden, residing in the borough of Manhattan, in the city, county, and State of New York, have invented new and useful Improvements in Apparatus for Treating Milk and other Liquids, of which the following is a specification.

This invention relates to apparatus for treating liquids, such as milk, cream and the like, to permit of the extraction of the butter fat or oil therefrom.

In apparatus of this type as heretofore constructed, the liquid is fed between the roughened faces of a pair of disks, one or both of which disks are rotated at a high velocity. The liquid is fed to the center or axis of rotation of said disks, and owing to the velocity at which they are rotated the liquid is thrown rapidly outward to the periphery of the disks through the action of centrifugal force, with the result that all of the butter fat or oil, which is in the nature of suspended globules in the liquid, is not subjected to the action of the roughened faces of the disks.

It is the principal object of the present invention to overcome this disadvantage and to provide an apparatus in which the liquid is forcibly fed between a pair of roughened surfaces, one of which is rotatable, and caused to be retained between and subjected to the action of said surfaces for some time, thereby assuring the thorough treatment of the liquid with the consequent laceration or rupture of the envelop of practically all of the fat or oil globules and the release of the oil therefrom.

Furthermore, owing to certain forces set up due to the high velocity at which the disks are necessarily rotated in the apparatus hereinbefore referred to, it takes considerable power to operate the same, and it is another object of the invention to provide a light, easy running and manually operable apparatus.

Another object of the invention is to provide means to adjust one of the surfaces to regulate the space between the same, as it has been found that the consistency of the fat or oil of different grades of cream or milk varies, and that should the space between the surfaces be sufficient to efficiently treat one grade of milk or cream it will not efficiently treat another grade of milk or cream. Furthermore, it has been found that when the surfaces are adjusted to treat the milk or cream for the purpose above set forth disintegration of the fat globules takes place as it is run through the machine.

In the preferred form of carrying out my invention I provide a pair of opposed roughened cone surfaces, one of which is in the form of a cone having depressions or recesses in the periphery thereof connected to a rotatable spindle journaled in a standard to rotate on a vertical axis, the other surface being in the form of a stationary shell or sleeve having depressions or recesses in the inner face to surround and conform to the shape of the cone, said shell adapted to have axial or longitudinal adjustment to regulate the space between the inner face of said shell and the periphery of the cone, with means to lock it in its adjusted positions, and provided with indices to indicate the extent of the space between such surfaces. A suitable receptacle is provided for the liquid to be treated, and a receptacle to receive the liquid after it has been passed through and treated by the machine. The cone is also provided with means to draw off the liquid to be treated from the receptacle and forcibly feed it between the cone surfaces.

In the drawings accompanying and forming a part of this specification, Figure 1 is a sectional side elevation of an apparatus embodying my invention.

Fig. 2 is a perspective view of the cone member and its rotating spindle.

Fig. 3 is a perspective view, partly in section to illustrate the inner roughened surface, of the adjustable shell or sleeve.

Fig. 4 is a perspective view of the means to lock the shell in its adjusted positions.

Fig. 5 is a perspective view of a portion of the receptacle for the liquid to be treated and its supporting means.

Fig. 6 is a perspective view of the receptacle to receive the liquid after it has passed between the opposed roughened surfaces; and Fig. 7 is a sectional plan view of the actuating means.

Similar characters of reference designate like parts throughout the different views of the drawings.

Figure 1:
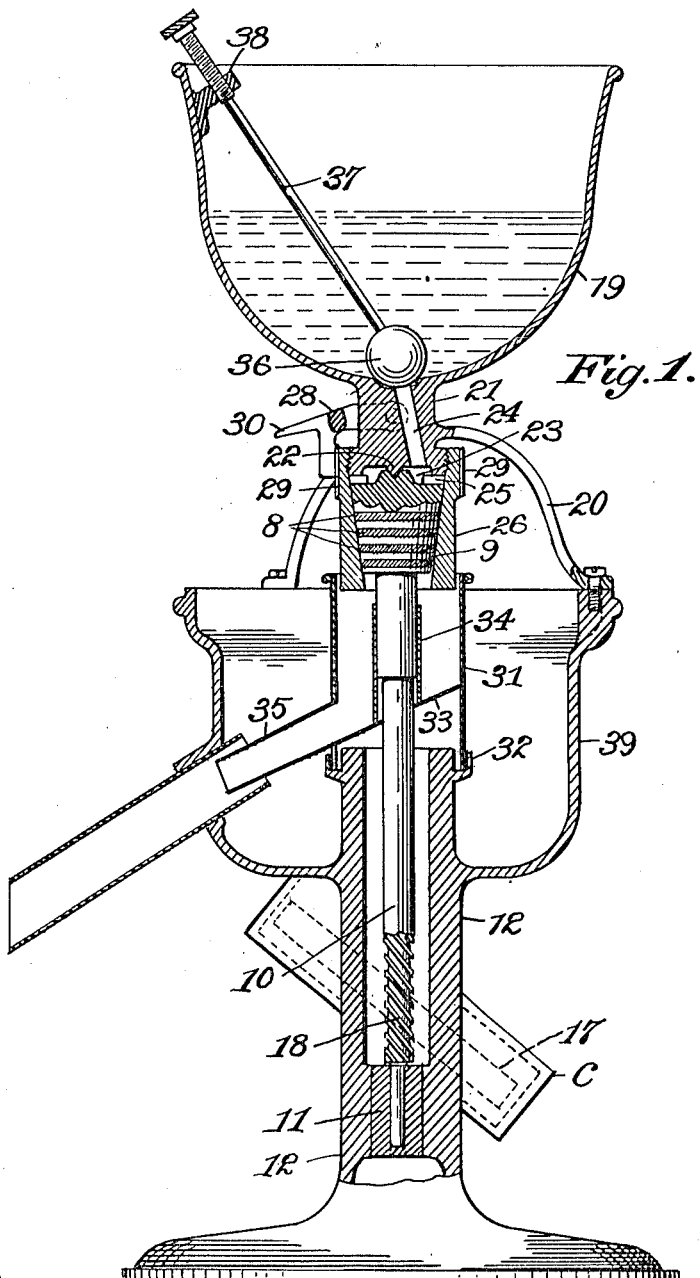

In the embodiment of my invention illustrated in the drawings I provide a pair of opposed roughened cone surfaces, one of which consists of a head or inverted cone 9 connected to, or constructed integral with, the upper end of a rotatable spindle 10 journaled at its lower end in a bushing 11 in the core of a supporting standard or column 12, the peripheral surface thereof having depressions or recesses 8, the edges of which recesses with the surface of the cone forming sharp edges. The spindle and connected cone are rotated through suitable gearing, in the present instance comprising a crank 13 fixed to a shaft 14, and to which shaft is also fixed a toothed or worm wheel 15 meshing with a worm 16 to which is connected a second toothed or worm wheel 17, said latter wheel meshing with a worm 18 on the spindle 10. The actuating gearing is inclosed in a suitable casing, designated in a general way by C, and which may constitute a portion of the supporting standard 12.

A receptacle 19 for the liquid to be treated is also supported upon the standard 12 in position directly above the cone 9 by means of laterally projecting bracket arms 20 fixed to or integral with a boss 21 projecting down from the bottom of the receptacle. The bottom face of the boss 21 has an annular recess portion with a central cone shaped projection 22 adapted to engage in a correspondingly shaped recess in the end of the cone 9 to constitute the bearing for the other end of the spindle 10. The top of the cone is also provided with an annular recess, and with the recess in the bottom of the boss 21 constitutes a chamber 23 communicating with the receptacle by a duct 24 in the boss. The top of the cone is also provided with recesses or channels 25, in the present instance shown as radial slots, extending from the annular recess to the periphery of the cone, for a purpose to be hereinafter described.

The other cone surface comprises a shell or a sleeve 26 to surround the cone 9 and screw threaded to the end of the receptacle boss 21 with the inner surface beveled to conform to the shape of the cone and spaced therefrom, said inner surface provided with depressions or recesses 27, the edges of which depressions with the inner surface of the shell forming sharp edges the same as the depressions in the periphery of the cone 9. The depressions in the cone 9 are preferably made at a slight angle relative to its axis of rotation, and the depressions in the shell at an angle opposite to the angle of depressions in the cone. The shell normally occupies a position so that the surface will be exceedingly close to the periphery of the cone, approximately one two thousandths of an inch apart, which ordinarily has been found sufficient to act upon certain grades of milk or cream to rasp off or break the membraneous covering of the fat or oil globules. To permit of the efficient treating of different grades of milk and cream, through the screw threaded connection of the shell with the boss 21 the shell may have longitudinal or axial adjustment relative to the cone, thereby increasing or decreasing the space between the shell and periphery of the cone, and locked in its adjusted positions by a latch 28 pivotally supported upon the boss 21 engaging in either one of a series of graduated notches or slots 29 in the periphery of the shell, and provided with a finger-piece 30 to throw it into and out of engagement with the notches 29. The periphery of the shell adjacent the notches 29 may be provided with suitable indices to indicate the extent of the space between the shell and cone when adjusted to certain positions. It will be obvious that by means of the screw threaded connection of the shell with the boss very fine adjustments of the space between the cone and shell may be obtained.

To receive the liquid as it emerges from between the cone surfaces after it has been treated, I provide a receptacle 31 supported upon an annular flange or seat 32 on the supporting column 12, said receptacle extending up around the shell 26 and having an inclined bottom 33 with a central sleeve 34 to snugly fit around the spindle 10, a spout 35 serving to continuously draw off the liquid from said receptacle.

The operation of my improved apparatus is substantially as follows: The receptacle 19 is filled with the liquid to be treated and the flow therefrom through the duct 24 normally cut off by a ball valve 36 seated in a recess from which the duct 24 leads, said ball having a stem 37 having screw threaded engagement with a lug, as at 38, to adjust the valve and regulate the flow of the liquid. The valve is now opened when the cone 9 is rotated through the gearing by the crank 13, the rotation of the cone creating a vacuum in the chamber 23 drawing the liquid from the receptacle through the duct 24 throwing it outward through the action of centrifugal force through the channels 25 to the periphery of the cone, thereby packing it against the shell 26 and forcing it between the cone and shell, and passing in a sinuous stream between the shell and cone parallel to the axis thereof, the cone revolving at a high velocity thoroughly acting on all portions of the liquid. The liquid as it emerges from between the shell and cone will be thrown outward against the sides of the receptacle 31 and collected therein, from which it is drawn by the spout 35.

My improved apparatus may be utilized as an attachment to a centrifugal cream separator, and vice versa, for which purpose the supporting standard is provided with a casing 39 to receive the bowl of the separator. To change the apparatus to a separator it is only necessary to remove the shell and cone with its connected spindle and insert the separator bowl with its actuating spindle in position in the casing.

Variations may be resorted to within the scope of my invention, and portions of the improvements may be used without others.

Having thus described my invention, I claim:—

1. An apparatus for treating milk and other liquids, comprising a pair of concentric cone surfaces one of which is roughened and one of which is rotatable, and means to introduce the liquid about the axis of rotation and through the action of centrifugal force forcibly feed the same between said surfaces.

2. An apparatus for treating milk and other liquids, comprising a pair of concentric cone surfaces one of which is roughened and rotatable, and means to introduce the liquid about the axis of rotation and through the action of centrifugal force forcibly feed the same between said surfaces.

3. An apparatus for treating milk and other liquids, comprising a pair of concentric and spaced apart roughened cone surfaces one of which is rotatable, said liquid being introduced to the axis of said cone-surfaces and through the action of centrifugal force fed between said surfaces.

4. An apparatus for treating milk and other liquids, comprising a receptacle for the liquid to be treated; and a pair of concentric and spaced apart roughened cone surfaces one of which surfaces is rotatable; the liquid being delivered from the receptacle to the axis of rotation of the inner surface and forcibly fed therefrom between the surfaces through the action of centrifugal force as the inner surface is rotated.

5. An apparatus for treating milk and other liquids, comprising a receptacle for the liquid to be treated; and a pair of concentric and spaced apart roughened cone surfaces the inner surface of which is rotatable; said cone surface being arranged so that as it is rotated it will draw the liquid from the receptacle about its axis of rotation and forcibly feed it therefrom between the surfaces by forces set up through the rotation of said surface.

6. An apparatus for treating milk and other liquids, comprising a receptacle for the liquid to be treated; a pair of concentric and spaced apart roughened cone surfaces the inner surface of which is rotatable; said inner surface being arranged to draw the liquid from the receptacle and forcibly feed it between said surfaces by forces set up as said inner surface is rotated; and a receptacle to receive the treated liquid as it is discharged from between the cone surfaces, said receptacle having a spout to continuously discharge the treated liquid therefrom.

7. In an apparatus for treating milk and other liquids, the combination of a rotatable head the peripheral surface of which is roughened; a shell to surround said head and spaced therefrom; and means to introduce the liquid about the axis of rotation of the head and said liquid forcibly fed to the space between said head and shell by forces set up as the head is rotated.

8. In an apparatus for treating milk and other liquids, the combination of a head rotatable on a vertical axis and having the periphery roughened; a shell to surround the periphery of said head and spaced therefrom; means to rotate the head; means to introduce the liquid to one end of the cone about its axis of rotation; and means integral with the head to deliver the liquid from about its axis of rotation to the space between the head and shell by forces set up as the head is rotated, substantially as and for the purpose specified.

9. In an apparatus for treating milk and other liquids, the combination of a head rotatable on a vertical axis and having the peripheral surface roughened; a shell to surround the periphery of said head and spaced therefrom and having its inner face roughened; and means integral with the head to cause the liquid to be fed around the axis of rotation thereof and forcibly fed between the faces of the head and the shell by forces set up as the head is rotated.

10. In an apparatus for treating milk and other liquids, the combination of a rotatable cone the peripheral surface of which is roughened; a shell in which said cone rotates, the inner walls of the shell being beveled to correspond to the bevel of the cone and spaced therefrom; and means to introduce the liquid to one end of the cone about its axis of rotation, and said end of the cone arranged to forcibly feed the liquid so introduced to the space between the shell and cone by forces set up as the cone is rotated.

11. In an apparatus for treating milk and other liquids, the combination of a cone rotatable on a vertical axis the peripheral surface of which cone is roughened; a shell in which said cone rotates, the inner surface of the shell being roughened and beveled to correspond to the bevel of the cone and spaced therefrom; and means to introduce the liquid to the top of the cone about its axis of rotation, and said end of the cone arranged to forcibly feed the introduced liquid to the space between the cone and shell through the action of centrifugal force.

12. In an apparatus for treating milk and other liquids, the combination of a cone rotatable on a vertical axis the peripheral wall of which is roughened; a shell to surround the periphery of and in which said cone rotates, the inner walls of the shell being roughened and beveled to correspond to the bevel of the cone and spaced therefrom, said shell being adjustable to regulate the space between the shell and cone; and means to introduce the liquid to the top of the cone about its axis of rotation, and the top of the cone arranged so that as it is rotated the introduced liquid is fed to the space between the faces of the cone and shell through the action of centrifugal force.

13. In an apparatus for treating milk and other liquids, the combination of a rotatable cone; a shell in which said cone rotates and spaced therefrom, the inner walls of the shell and the periphery of the cone being roughened; means to introduce the liquid to the top of the cone about its axis of rotation; and means to feed the liquid from the axis of rotation of the cone between the periphery of the cone and shell through the action of centrifugal force.

14. In an apparatus for treating milk and other liquids, the combination of a rotatable cone; a shell to surround the periphery of and in which said cone rotates with a space between said shell and cone, the inner walls of the shell and the periphery of the cone being roughened to present opposed roughened faces; means to which the shell is connected to inclose one end of the cone and serve as a support for said end of the cone with a space between said means and the cone about the axis of rotation of the latter, and to which space the liquid to be treated is introduced, and said end of the cone being arranged to feed the liquid from such space to the periphery thereof and to the space between the shell and cone by forces set up as the cone is rotated.

15. In an apparatus for treating milk and other liquids, the combination of a rotatable cone; a shell in which said cone rotates, the inner walls of the shell being beveled to correspond to the bevel of the cone and spaced therefrom; recesses in the periphery of the cone, the edges of said recesses with the surface of the cone and shell forming sharp edges; and means to introduce the liquid to the top of the cone and therefrom between the opposed faces of the cone and shell through forces set up as the cone is rotated.

16. In an apparatus for treating milk and other liquids, the combination of a rotatable cone having a recess in one end about its axis of rotation with slots extending from the recess to the periphery of the cone; means to inclose the recessed end of the cone and the sides, the sides of said means corresponding to the bevel of the cone and spaced therefrom and having an opening for the introduction of the liquid to the recess in the end of the cone; and recesses in the inner walls of said means and the periphery of the cone, substantially as and for the purpose specified.

17. In an apparatus for treating milk and other liquids, the combination of a rotatable cone having a recess in one end about its axis of rotation with slots extending from the recess to the periphery of the cone and having its peripheral surface roughened; means coöperating with the recessed end of the cone to rotatably support the same having a recess coöperating with the recess in the cone to form a chamber with which the slots in the cone communicate and to which the liquid to be treated is introduced; a shell in which said cone rotates, the inner walls of the shell being beveled to correspond to the bevel of the cone and spaced therefrom; means to adjustably connect the shell to said cone supporting means to regulate the space between the cone and shell; means to lock the shell in adjusted positions; recesses in the periphery of the cone and the inner wall of the shell, the edges of said recesses with the surfaces of the cone and shell forming sharp edges, the liquid introduced to the recess at the end of the cone through forces set up by the rotation of the cone being forcibly fed to the space between the cone and shell, substantially as and for the purpose specified.

18. In an apparatus for treating milk and other liquids, the combination of a cone rotatable on a vertical axis and having the periphery roughened; a shell to surround and conform to the periphery of the cone and spaced therefrom, the inner walls of the shell also being roughened; means to adjustably support said shell and rotatably support one end of the cone and inclose said end of the cone; a chamber between the end of the cone and said means to which the liquid to be treated is introduced; and slots in the end of the cone leading from said chamber to the periphery of the cone, substantially as and for the purpose specified.

19. In an apparatus for treating milk and other liquids, the combination of a cone rotatable on a vertical axis and having the periphery roughened; a shell to surround and conform to the periphery of the cone and spaced therefrom, the inner walls of the shell also being roughened; means to introduce the liquid around the axis of rotation of the cone and therefrom through forces set up by the rotation of the cone between the cone and shell; means to adjustably support said shell and rotatably support one end of the cone and inclose said end of the cone; a chamber between the end of the cone and said means to which the liquid to be treated is introduced; and slots in the end of the cone leading from said chamber to the periphery of the cone, substantially as and for the purpose specified.

20. In an apparatus for treating milk and other liquids, the combination with a cone rotatable on a vertical axis and having its peripheral wall roughened; a recess in the top of the cone; slots extending from said recess to the periphery of the cone; means to rotatably support the cone at its upper end arranged to coöperate with the recess in the end of the cone to form a chamber with which the slots in the cone communicate; a shell connected to said cone supporting means to surround and conform to the periphery of the cone and spaced therefrom and having its inner wall roughened; the liquid as it is introduced to the chamber at the top of the cone being thrown outward through the slots through forces set up by said cone as it is rotated; and a receptacle to receive the treated liquid as it is discharged from between the cone and shell.

21. In an apparatus for treating milk and other liquids, the combination of a rotatable cone, the periphery of which is roughened; a shell surrounding and conforming to the periphery of said cone and spaced therefrom, the inner surface of said shell being roughened; means to introduce the liquid between said cone and shell; means to longitudinally adjust the shell to regulate the space between the shell and cone; graduated slots on the periphery of the shell; and a pivoted latch to engage in either one of said slots to lock the shell in its adjusted positions.

22. In an apparatus for treating milk and other liquids, the combination of a receptacle for the liquid to be treated; an inverted cone having its periphery roughened and rotatable on a vertical axis, said cone having an annular recess in the upper end with slots extending from said recess to the periphery of the cone, and said cone being so supported that the annular recess in conjunction with the receptacle constitutes a chamber having communication with the receptacle and with which the slots communicate; and a shell having its inner surface roughened surrounding and conforming to the periphery of the cone and spaced therefrom.

23. In an apparatus for treating milk and other liquids, the combination of a receptacle for the liquid to be treated having a downwardly projecting boss; an annular recess in the bottom of the boss; an inverted cone having its periphery roughened and rotatable on a vertical axis, said cone having an annular recess in its upper end with slots extending from said recess to the periphery of the cone, and said cone being so supported that the recess therein with the recess in the receptacle boss constitutes a chamber with which the slots communicate; a duct in the receptacle boss to conduct the liquid from the receptacle to said chamber; and a shell surrounding and conforming to the periphery of the cone and spaced therefrom, said shell having its inner surface roughened and screw threaded to the receptacle.

24. In an apparatus for treating milk and other liquids, the combination of a supporting standard; a spindle supported in said standard to rotate on a vertical axis; a receptacle for the liquid to be treated supported by the standard; an inverted cone having its periphery roughened connected to and rotatable with the spindle, said cone having a recess in its upper end communicating with the liquid receptacle and slots extending from the recess to the periphery of the cone; and a shell the inner surface of which is roughened connected to the receptacle, said shell surrounding and conforming to the periphery of the cone and spaced therefrom.

ALFRED FORNANDER.

Witnesses:
John O. Seifert,
P. Philipp.